United States Patent Office 3,644,619
Patented Feb. 22, 1972

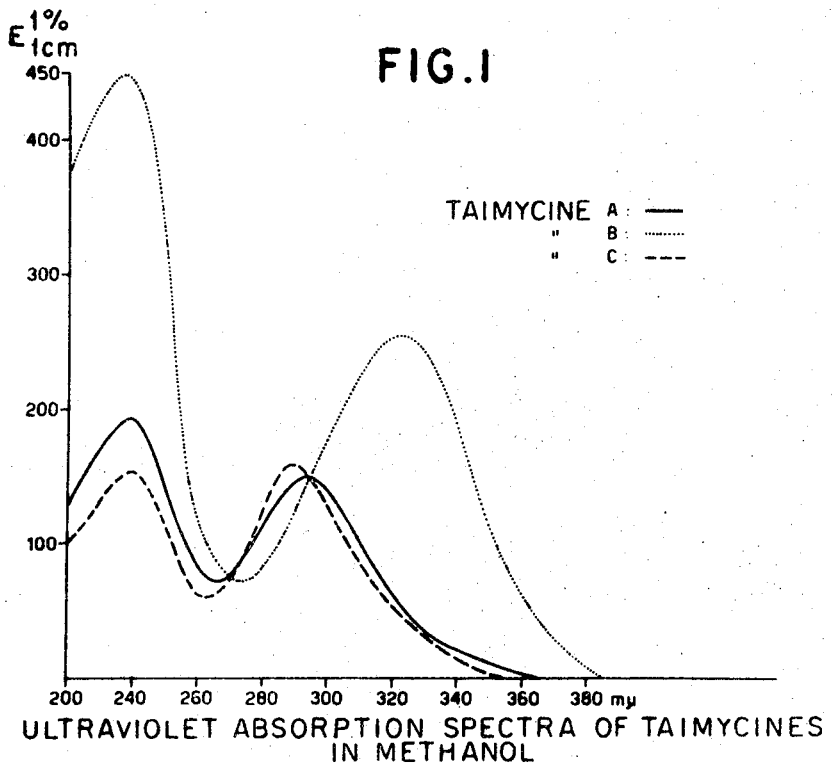
ULTRAVIOLET ABSORPTION SPECTRA OF TAIMYCINES IN METHANOL
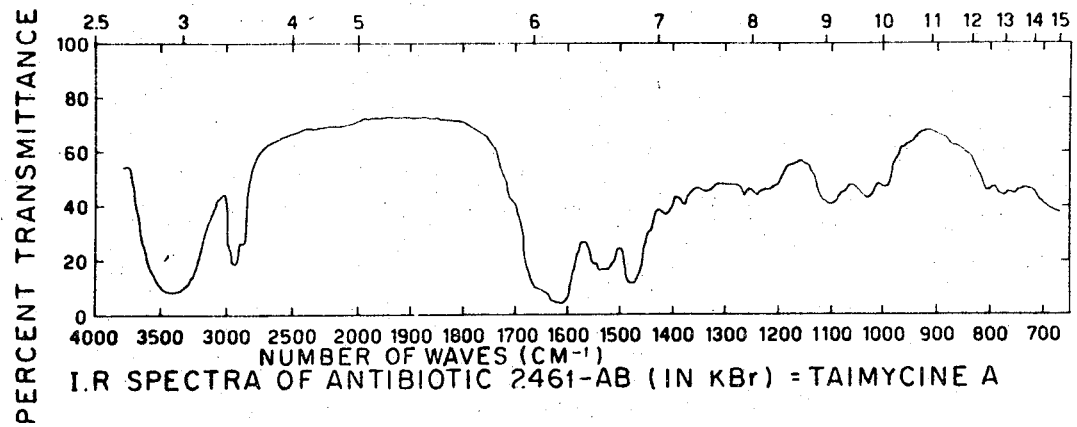
I.R SPECTRA OF ANTIBIOTIC 2461-AB (IN KBr) = TAIMYCINE A I.R. SPECTRA OF ANTIBIOTIC 2461-SZ (IN KBr) = TAIMYCINE B I.R. SPECTRA OF ANTIBIOTIC 2461-C (IN KBr) = TAIMYCINE C

3,644,619
ANTIBIOTIC COMPLEX TAIMYCINE AND METHOD FOR THE PREPARATION THEREOF
Giuseppe Cassinelli, Rivanazzano, Pavia, and Ernesto Cotta, Arpad Grein, and Rosanna Mazzoleni, Milan, Italy, assignors to Società Farmaceutici Italia, Milan, Italy
Continuation-in-part of application Ser. No. 734,875, June 6, 1968. This application July 21, 1970, Ser. No. 56,773
Claims priority, application Italy, June 6, 1967, 16,923/67
Int. Cl. A61k 21/00
U.S. Cl. 424—121  11 Claims

ABSTRACT OF THE DISCLOSURE

A microbiological process for the preparation of the new antibiotic substance Taimycine and its salts consisting of Taimycine A, Taimycine B, Taimycine C. The process is characterized in that the new microorganism *Streptomyces michiganensis* var. *amylolyticus* is cultivated in aerobic conditions in a liquid cultural medium containing a carbon source, nitrogen source and mineral salts at a temperature of from 24° to 37° C. over a period of time of from 72 to 160 hours at a pH of from 6 to 8 and that the antibiotic complex thus obtained is isolated from the fermentation broth by extraction with suitable solvents and successive precipitation and the antibiotic complex may be separated into the three components Taimycine A, Taimycine B and Taimycine C. A new antibotic substance called Taimycine and its salts having antihelmintic and antiprotozoal activity and its three active antibiotic components called Taimycine A, Taimycine B and Taimycine C are also described. The microorganism has been deposited among others at the Institute of Microbiology of Rutgers University receiving the index number I.M.R.U. 3932 and at the Institute of Plant Pathology at the University of Milan (Italy), receiving the index number I.P.V. 1953.

This is a continuation-in-part application of Ser. No. 734,875, filed June 6, 1968, now abandoned.

Our invention relates to an antibiotic complex Taimycine which includes the substances Taimycine A, Taimycine B, Taimycine C and salts thereof, which have proved useful in therapy as antihelmintic and antiprotozoal agents. The invention includes a process for the preparation of this antibiotic complex by cultivation of a Taimycine-producing strain of the hitherto unknown microorganism *Streptomyces michiganensis* var. *amylolyticus* which we also call Streptomyces F.I. 2461. *Streptomyces michiganensis* var. *amylolyticus* has been deposited at the Commonwealth Mycological Institute, Ferry Lane, Kew, Surrey (Great Britain) receiving the index number I.M.I. 131,670, and at the Institute of Microbiology of Rutgers University (U.S.A.) receiving the index number I.M.R.U. 3932, and at the Institute of Plant Pathology at the University of Milan (Italy) receiving the index number I.P.V. 1953. At the last named institute, the microorganism is freely available. The microorganism *Streptomyces michiganensis* var. *amylolyticus* has been isolated from a soil sample taken in Trang (Thailand). It shows the following morphological, cultural and biochemical properties.

Morphological properties

On the usual culture media, the vegetative mycelium consists of hyphae, of 0.5–0.9µ thickness, long and abundantly branched, which form thicker hyphae having a thickness of 1.1–1.4µ collected in bunches sympodially branched. The latter are rather long, straight or flexuous and form conidia which are initially disposed in chains and then free. The conidia are oval, have a smooth surface and a size of from 1.1 to 1.4 x 1.2–1.9µ.

Cultural and biochemical properties

Table 1 lists the cultural properties obtained on different media, culturing the microorganism at 28° C. and carrying out the observations on the 3rd, 8th, 15th and 20th day after inoculation. The microorganism shows a quick and abundant development with the formation of a compact vegetative mycelium, rather solid with a smooth patina on synthetic media, a slightly folded patina on organic media. On synthetic media, the color of the vegetative mycelium and of its back-side is from straw-yellow to lemon-yellow while on organic media it is ochre and light chestnut-brown. On organic media, there is also produced a light tea-colored soluble pigment which changes to a light chestnut-brown tonality on aging. The aerial mycelium is abundant on all cultural media, having a rather pulverous aspect. It is ivory-white colored with sulfur-yellow tonalities on synthetic media, while on organic media this color changes from chalk-white to ivory-white with tonalities sometimes light beige, sometimes attenuated sulphur-yellow. The biochemical properties of the microorganism under examination are:

gelatin: rapid total hydrolysis
nitrates: are reduced to nitrites
starch: discrete hydrolysis
milk: coagulation and peptonization
melanine: light production
tyrosine: rapidly decomposed
production of hydrogen sulphide: modest The microorganism utilizes: 1-arabinose, glucose, d-xylose, d-fructose, maltose, d-mannitol and mesoinositol. It does not utilize: saccharose, ramnose and raffinose. The microorganism does not grow at 50° C. and does not produce sclerotia. In submerged stirred liquid culture, the strain produces the antibiotic complex Taimycine.

TABLE 1.—CULTURAL PROPERTIES

| Medium | Growth | Aerial mycelium | Vegetative mycelium | Soluble pigments |
|---|---|---|---|---|
| Bennet's agar [1] | Abundant; in smooth patina | Abundant, from ivory cream to light beige with yellow-sulphur flat tonalities. | From straw-yellow to lemon-yellow to light chestnut-brown with identical back-side. | Light tea color. |
| Czapeck's agar [1] | Abundant | Abundant, from white to ivory; flat. | Scanty, colorless | |
| Asparagine glucose agar.[1] | Abundant; in smooth patina | Abundant, flat; from ivory-white to pale yellow-sulphur. | Also the backside from straw-yellow to lemon-yellow. | |
| Glycerine glycine agar.[1] | do | Abundant; flat ivory color with beige tonalities, sometimes pale pink-vinous. | From straw-yellow to lemon-yellow with sometimes brown tonalities; identical back-side. | |
| Emerson's agar [1] | Abundant; in patina more or less relieved. | Abundant; flat, from chalk-white to beige-white. | Chestnut-brown colored; identical back-side. | Light chestnut-brown color. |
| Starch agar and salts.[2] | Abundant; in smooth patina | Abundant; flat; yellow-sulphur | From lemon-yellow to light ochre-yellow; identical back-side. | |
| Potato agar [3] | do | Abundant; flat, ivory-white with beige tonalities. | From straw-yellow to ochre-yellow to light chestnut-brown; identical back-side. | Tea color. |

TABLE 1.—Continued

| Medium | Growth | Aerial mycelium | Vegetative mycelium | Soluble pigments |
|---|---|---|---|---|
| Oats agar [4] | do | From ivory-white to sulphur-yellow abundant, flat. | From straw-yellow to lemon-yellow to light-brown; identical backside. | |
| Glycerine-asparagine agar [1] | do | From ivory-white to clear sulphur-yellow; abundant, flat. | From straw-yellow to lemon-yellow; identical backside. | |
| Yeast-extract glucose agar.[1] | Abundant; in patina more or less relieved. | From chalk-white to light-biege with sulphur-yellow tonalities; abundant, flat. | More or less dark chastnut-brown; identical back-side. | Chestnut-brown color. |
| Peptone-starch agar.[1] | Abundant; in smooth patina | From chalk-white to beige, to sulphur-yellow; abundant, flat. | Light chestnut-brown with identical back-side. | Do. |
| Peptone agar potassium nitrate.[1] | do | Abundant; flat, chalk-white color | From straw-yellow to light chestnut-brown with identical backside. | Tea color. |

[1] Waksman, S. A.: The Actinomycetes, vol. II, The William and Wirlkins Co., 1961, p. 328-434.
[2] Pridham, T. G., Anderson, P., Foley, C., Lindenfelser, L. A., Hesseltine, C. M., and Benedict, R. B.: Antibiotics Annual, 1956-1957, p. 947-953.
[3] To 200 g. of potatoes (boiled and filtered through gauze) 20 g. of glucose and 20 g. of agar are added. Then the mixture is taken up to a volume of 1 liter and sterilized at 120° C. for 20 minutes.
[4] Baldacci, E., Giolitti, G., Küster, E., and Scotti, T.: Journal of Microbiology 1961, 9, p. 39.

Identification of the strain

The properties of the microorganism described above relate it to the genus Streptomyces Waksman and Henrici (Bergey's Manual of Determinative Bacteriology, 7th ed., 1957, p. 744-745). The strain belongs to the section "Rectus flexibilis" series "olive-buff" of Pridham et al. (appl. Microbiol. 1958, 6, p. 52), to the series "virgatus" of Baldacci (Giornale di Microbiologia, 1958, 6, p. 10), to the series "Erythrochromogenes" of Waksman (The Actinomycetes, vol. II, 1961, p. 117 and p. 149), and to the group of streptomycetes having "griseus" aerial mycelium of Hütter (Giornale di Microbiologia, 1963, 11, p. 191). A comparison between the properties of the microorganism under examination and those of the species belonging to the cited systematic groups (Taxa) has shown a close resemblance between the microorganism under examination and *Streptomyces michiganensis*, Corbaz et al. (Arch. Mikrobiol., 1957, 26, p. 205). Tables 2 and 3 give comparative data of the microorganism under examination and the last-mentioned species. The differences between the two cultures are in variations of tonality in the vegetative mycelium color, in the aerial mycelium color, and starch utilization.

TABLE 3.—BIOCHEMICAL PROPERTIES

| | S.F.I. 2461 | S. michiganensis 14970 ATCC |
|---|---|---|
| Utilization of: | | |
| Glucose | + | + |
| l-arabinose | + | + |
| d-Xylose | + | + |
| d-Fructose | + | + |
| Maltose | + | + |
| d-Mannitol | + | + |
| Saccharose | − | − |
| Ramnose | − | − |
| Raffinose | − | − |
| Hydrolysis of gelatin | + | + |
| Attack of tyrosine | + | + |
| Production of melanine | + | − |
| Hydrolysis of starch | + | − |
| Production of hydrogen sulphide | + | + |
| Reduction of nitrates | + | + |
| Coagulation and peptonization of milk | + | + |

As a result of the above comparison of the biochemical properties of *Streptomyces* F.I. 2461 and *Streptomyces michiganensis* strain 14970 ATCC, we conclude that the microorganism *Streptomyces* F.I. 2461 belongs to the species *Streptomyces michiganensis*. The differences pointed out make it possible to consider the strain F.I. 2461 a variety of this species for which we propose the

TABLE 2.—CULTURAL PROPERTIES

| | Streptomyces F.I. 2461 | | Streptomyces michiganensis strain 14970 ATCC | |
|---|---|---|---|---|
| Medium | Vegetative mycelium | Aerial mycelium | Vegetative mycelium | Aerial mycelium |
| Bennet's agar | From straw-to lemon-yellow until light chestnut-brown; tea-colored soluble pigment. | Light-beige with sulphur-yellow tonalities; abundant. | From straw-to lemon-yellow until light chestnut-brown; tea-colored soluble pigment. | Beige with sulphur-yellow tonalities; abundant. |
| Czapeck's agar | Colorless | Fair white | Colorless | Fair white. |
| Asparagine glucose agar | From straw-to lemon-yellow | From ivory-white to clear beige; abundant. | From straw-to lemon-yellow | Ivory-white; abundant. |
| Asparagine glycerine agar. | Lemon-yellow | Beige; abundant | Lemon-yellow | Beige; abundant. |
| Emerson's agar | Chestnut-brown, soluble pigment chestnut-brown. | Beige; abundant | Chestnut-brown; chestnut brown soluble pigment. | Beige with sulphur-yellow ton alities; abundant. |
| Starch agar and salts. | From straw-to lemon-yellow | From beige to pale sulphur-yellow; abundant. | From lemon-yellow to orange-yellow; soluble pigment lemon-yellow colored. | From beige to clear sulphur-yellow; abundant. |
| Potato agar | From straw-yellow to ochre to light chestnut-brown; tea colored soluble pigment. | Ivory-white with beige tonalities; abundant. | From straw-yellow to ochre to light chestnut-brown; tea colored soluble pigment. | Ivory-white with beige tonalities; abundant. |
| Oats agar | Straw-yellow to lemon-yellow | Ivory-white with beige tonalities sometimes sulphur-yellow; abundant. | From lemon-yellow to orange-yellow; lemon colored soluble pigment. | From beige-to sulfur-yellow; abundant. |
| Glycerine-asparagine agar. | do | Ivory-white to sulphur-yellow; abundant | Straw-yellow to lemon-yellow | Ivory-white to sul-yellow; abundant. |
| Yeast-glucose extract agar. | Light chestnut-brown; chestnut-brown soluble pigment. | From chalk-white to light beige; abundant. | Light chestnut-brown; chestnut-brown soluble pigment. | Beige with clear sulphur-yellow tonalities; abundant. |
| Potassium nitrate-peptone agar. | From straw-yellow to light chestnut-brown. | Chalk-white, abundant | From straw-yellow to light chest nut-brown. | Absent. |
| Tyrosine agar (Gordon et al., 1955) [1] | Production of chestnut soluble pigment. Quick decomposition of tyrosine. | | Production of a black soluble pigment. Slow decomposition of tyrosine | |
| Tyrosine agar (Waksman, 1961). | Identical behavior of both the strains with slight production of a melanoide pigment. | | | |

[1] Gordon, R.E. and Smith M.M.J. Bact. 1955 69, 147.

denomination *Streptomyces michiganensis* var. *amylolyticus*. Hütter (1963) has shown that strains belonging to the species *Streptomyces michiganensis* may produce various antibiotics having antibacterial and antifungal activity; however, the production of substances having antihelmintic activity is not known. Examination carried out by us has confirmed that the mycelium extract of the strain 14970 ATCC of *Streptomyces michiganensis* does not contain substances having antihelmintic activity.

The microorganism *Streptomyces michiganensis* var. *amylolyticus* or F.I. 2461 may be stored by sequential transfers on solid media or by lyophylization of a suspension of spores in milk.

The invention provides a microbiological process for the preparation of the antibiotic complex Taimycine which comprises fermentation of a Taimycine-producing strain of the microorganism *Streptomyces michiganensis* var. *amylolyticus* in a liquid culture medium containing an assimilable source of carbon, an assimilable source of nitrogen and mineral salts. The microorganism is preferably grown in a liquid cultural meidum under aerobic conditions at from 24° C. to 37° C., preferably 28° C., for from 72 to 160 hours. The pH may vary from 6 to 8 according to the fermentation medium used.

As a carbon source glucose, dextrin, starch, various meals (of Indian maize, soya or wheat, for example), corn steep and other substances may be used. The nitrogen source, besides the above-mentioned complex substances containing nitrogen, may for example be casein, a casein hydrolyzate, cotton-seed meal and ammonium salts such as a sulphate, phosphate, chloride or other substance. The mineral salts vary according to the medium employed. Calcium carbonate is nearly always present and the chlorides, sulphates, phosphates, for example, of sodium, potassium, magnesium, manganese, iron, copper, zinc and cobalt may be added. The fermentation may be carried out in Erlenmeyer flasks or in laboratory or industrial fermenters of various capacity.

The antibiotic complex Taimycine comprises three substances called Taimycine A, Taimycine B and Taimycine C, which show similar physico-chemical properties but different biological activity. The determination of the concentration of the antibiotic complex in the culture medium can be carried out during the growth of the microorganism by testing samples obtained by extracting the moist mycelium with methyl alcohol. After evaporation of the solvent in vacuo, the residue is taken up with the smallest possible volume of dimethylformamide and then diluted with water. Such samples are tested on microorganisms sensitive to the antibiotic, for example *Rhabditis macrocerca*, by preparing a series of dilutions of the sample under examination and comparing them with solutions of the antibiotic complex of known titer. Samples obtained from subsequent purifications may be titrated analogously. Alcoholic solutions of samples partially purified may be spectrophotometrically titrated at 290 and 320 m$\mu$ in comparison to samples of the components of the complex of known titer.

When the fermentation is over, the antibiotic complex mostly contained in the mycelium can be extracted with an organic solvent such as a lower alcohol, acetone, chloroform, methylene dichloride or methylisobutylketone. Methyl alcohol is employed in practice. After three extractions carried out each with a volume which is ⅓ of that of the culture, the extracts are collected and concentrated under reduced pressure to from ⅙ to ⅛ of the original volume. The resulting precipitate which contains 10% of the antibiotic is filtered and centrifuged. The supernatant, adjusted to pH 5.8–6.2, is extracted with petroleum ether to remove impurities. The lower layer is extracted with chloroform, the extract washed with water is dried over anhydrous sodium sulphate, concentrated under reduced pressure and precipitated with petroleum ether or with hexane. The crude precipitate contains 10–15% of antibiotic. These crude products are dissolved in chloroform or in a mixture of chloroform:carbon tetrachloride:methyl alcohol:water. The solution is adsorbed over a chromatographic column of silicious acid suspended in chloroform. The column is washed with chloroform to remove impurities and then eluted with chloroform containing increasing percentages of ethyl alcohol. The elution is carried out with analysis of the U.V. spectrum of samples of the various fractions and by thin layer chromatography. By eluting with chloroform-ethanol (3:1) Taimycine C is obtained; by eluting with chloroform-ethanol (2:1) Taimycine B is obtained; by eluting with increased percentages of ethanol Taimycine A containing variable percentages of Taimycine B is obtained. By diluting the concentrated eluates with water and adjusting the solution to pH 6, partially purified products are recovered. By slow evaporation of the remaining alcohol, the sodium salts from the aqueous concentrates precipitate. Taimycine C may be further purified by crystallization from methanol-water. Taimycine A and B are purified by countercurrent distribution using respectively chloroform-carbon tetrachloride-methyl alcohol-water (3:2:4:1) and (2.5:2.5:4:1) mixtures. They precipitate from aqueous solutions at pH 6–6.2 as sodium salts. On the average 40 mg. of Taimycine A, 15 mg. of Taimycine B and 5 mg. of Taimycine C per liter of culture broth are obtained.

Physico-chemical properties

The substances Taimycine A, B and C have been isolated as sodium salts in the form of white amorphous powders which are stable at neutral or weakly basic pH. They are soluble in dimethylformamide, dimethylsulphoxide, and dioxane, in aqueous alcohols and aqueous acetone; sparingly soluble in lower alcohols, chloroform, acetone, benzol; and practically insoluble in water and petroleum ether. The main physico-chemical properties are given in Table 4.

TABLE 4.—PHYSICO-CHEMICAL PROPERTIES

| | Property | | |
|---|---|---|---|
| | Taimycine A | Taimycine B | Taimycine C |
| Melting point | ¹ 250° C. | ¹ 260° C. | ¹ 240° C. |
| $[\alpha]_D^{23°}$ {c 0.9 dioxane | +7° | +45° | −12° |
| {c 0.77 methanol | +24° | | |
| Percent | | | |
| Carbon | 60.30 | 67.26 | 62.50 |
| Hydrogen | 7.88 | 7.97 | 8.11 |
| Nitrogen | 4.71 | 5.98 | 4.45 |
| Sodium | 4.01 | 1.51 | 2.39 |
| U.V. spectrum | | | |
| $\lambda$ CH₃OH max | 240 and 294 m$\mu$ | 238 and 321 m$\mu$ | 240 and 290 m$\mu$ |
| | ($E_{1cm}^{1\%}$ 192 and 149). | ($E_{1cm}^{1\%}$ 449 and 255). | ($E_{1cm}^{1\%}$ 152 and 157). |
| $\lambda_{max}$.NaOH 0.05 N in CH₃OH | 244 and 292 m$\mu$ | 235 and 320 m$\mu$ | 246 and 287 m$\mu$ |
| | ($E_{1cm}^{1\%}$ 200 and 140). | ($E_{1cm}^{1\%}$ 470 and 250). | ($E_{1cm}^{1\%}$ 154 and 156). |
| $\lambda_{max}$.HCl 0.05 N in CH₃OH | 322.5 m$\mu$ | 322.5 m$\mu$ | No peaks. |
| | ($E_{1cm}^{1\%}$ 50). | ($E_{1cm}^{1\%}$ 300). | |

¹ With decomposition.

Taimycine B has also been isolated as a free acid which shows the same pharmacological behavior as the sodium salt and the following properties: melting point=245° C., C=68.85%; H=7.81%; N=5.35%;

U.V. Spectrum $\lambda_{max.}^{CH_3OH}$ 322 ($E_{1\,cm.}^{1\%}$ 306)

TABLE 5.—REACTIONS

| Reagent | Taimycine A | Taimycine B | Taimycine C |
|---|---|---|---|
| Ferric chloride | + | + | + |
| Titanium chloride | − | + | − |
| 2:4 DNPH | + | + | − |
| Diazo | − | − | + |
| Green rameic salt soluble in chloroform | − | + | − |

Taimycines do not react with the following reagents: ninidrin, nitroprussate, Molish, Fehling, Bial, Anthrone, Orcinol, Ehrlich and Sakaguchi. On the grounds of these physico-chemical properties, Taimycine B especially shows some analogies with the antibiotic Streptolidigine (Waksman and Lechevalier—The Actinomycetes 3, 1962, p. 371). It clearly differs from this in biological activity and chromatographic properties which are listed in Table 6.

*Rhabditis macrocera* kept in cultures in the laboratory has been cultivated in agar treated with the components of the antibiotic Taimycine in various concentrations.

*Syphacia obvelata* and *Hymenolepis nana*, taken from experimentally infected mice, have been immersed in saline solutions buffered at pH 7.5. The components of the antibiotic Taimycine were added at different concentrations. The extent of survival of the two helmintes has been tested at different contact periods. Minimum Immobilizing Dose means the smallest quantity of the substance capable of immobilizing the movement of the tested organism "in vitro." In Table 8 are the Minimum Inhibiting Dose and the Minimum Immobilizing Dose determined after 1 and 4 hours for the separated fractions of the antibiotic complex Taimycine.

TABLE 8

| | Taimycine A | | | Taimycine B | | | Taimycine C | | |
|---|---|---|---|---|---|---|---|---|---|
| | | Minimum immobilizing dose, γ/cc. | | | Minimum immobilizing dose, γ/cc. | | | Minimum immobilizing dose, γ/cc. | |
| Tested species | MID γ/cc. | In 1 hour | In 4 hours | MID, γ/cc. | In 1 hour | In 4 hours | MID γ/cc. | In 1 hour | In 4 hours |
| Rhabditis macrocerca | 31 | + | + | 5 | + | + | 250 | + | + |
| Syphacia obvelata | ++ | >1,000 | 1,000 | ++ | >1,000 | 1,000 | ++ | >1,000 | >1,000 |
| Hymenolepis nana | ++ | 1,000 | 100 | ++ | 1,000 | 100 | ++ | >1,000 | >1,000 |

NOTE.—Explanation: +=not determined; + +=Not determinable.

The antihelmintic activity has been tested "in vitro" on Albino mice with a body weight of 25 g. and experimentally infected with *Hymenolepis nana*. The experiments have been carried out on groups of 10 mice each. Results show that 100% of the mice infected with *Hymenolepis nana* at the 25th day after the infection are cured by administration of different fractions of the antibiotic Taimycine by gastric tubing at doses clearly lower

TABLE 6.—CHROMATOGRAPHIC PROPERTIES (THIN LAYER)

| Layer | Solvent | $R_f$ Taimycine A | $R_f$ Taimycine B | $R_f$ Taimycine C | $R_f$ sodium streptoligidine |
|---|---|---|---|---|---|
| MN Kieselgel G 254 | Butyl alcohol-acetone-water (4:5:1) | 0.40 | 0.30 | 0.70 | 0.85 |
| Kieselgel G | Butyl alcohol-acetone-water (4:5:1) | 0.60 | 0.30 | 0.75 | 0.80 |
| Kieselgel HF 254-366 | Butyl alcohol-acetone-water (4:5:1) | 0.35 | 0.25 | 0.50 | 0.85 |
| MN Kieselgel G 254 | Ethyl acetate-pyridine-isopropyl alcohol-water (7:2:3:2) | 0.50 | 0.50 | 0.80 | 1.00 |
| Kieselgel G | Propyl alcohol-ethyl acetate-water (8:1:1) | 0.45 | 0.25 | 0.50 | 0.60 |
| Alumina | Butyl alcohol-pyridine-water (6:4:3) | 0.50 | 0.30 | 0.70 | |

Antiprotozoal activity

The antiprotozoal activity has been tested "in vitro" on *Entamoeba histolytica* strain F22 in Pavlova monophase medium. After incubation at 37° C. for 48 hours, microscopic reading in a Foot chamber made it possible to determine the Minimum Inhibiting Dose (MID) as reported in Table 7. Minimum Inhibiting Dose means the lowest quantity of the substance capable of totally inhibiting the development "in vitro" of the tested organism.

TABLE 7

Antiprotozoal activity "in vitro"

| Tested fraction: | MID γ/cc. |
|---|---|
| Taimycine A | 6.25 |
| Taimycine B | 0.78 |
| Taimycine C | 25 |

Antihelmintic activity

The antihelmintic activity has been tested "in vitro" on different helmintes by different techniques:

than permitted by the toxicity of the fraction. In Table 9 are the acute toxicity figures ($LD_{50}$) for mice.

TABLE 9.—ACUTE TOXICITY

| Administration route | Taimycine A | Taimycine B | Taimycine C |
|---|---|---|---|
| Oral | >1,000 | 250 | >1,000 |
| Intraperitoneous | 25 | 5 | 250 |

In Table 10 is the antihelmintic activity "in vivo"—administration of the antibiotic Taimycine by gastric tubing for 5 days.

TABLE 10.—THERAPEUTIC ACTIVITY

| | Minimum therapeutic dose, mg./kg. | | |
|---|---|---|---|
| Infected by— | Taimycine A | Taimycine B | Taimycine C |
| Hymenolepis nana | 25 | 25 | 50 |

The invention includes pharmaceutical compositions containing one or more antibiotics according to the invention in admixture with a vehicle, for example a diluent or carrier.

The following examples serve to illustrate the invention without limiting the same:

EXAMPLE 1

Two 300 cc. Erlenmeyer flasks were prepared, each containing 60 cc. of the medium:

|   | Percent |
|---|---|
| Dextrin | 3 |
| Casein | 0.5 |
| Calcium carbonate | 0.4 |
| Ammonium sulphate | 0.1 |
| Potassium dihydrogen monophosphate | 0.01 |
| Corn steep liquor | 0.3 |
| Tap water to 100. | |

Sterilization was performed by heating at 120° C. for 20 minutes. The pH of the medium after sterilization was from 6.8 to 7. Each flask was inoculated with 0.5 cc. of a spore suspension obtained by washing, with 5 cc. of sterile distilled water, the patina of a 15 day old slant culture of Streptomyces F. I. 2461 developed on glucose potato agar. The flasks were incubated at 28° C. for 24 hours on a rotary shaker with a stroke of 3 cm. at 225 r.p.m. Thereafter 2 cc. of this culture were used each to inoculate a 300 cc. flask containing 60 cc. of the productive medium:

|   | Percent |
|---|---|
| Soluble starch | 12 |
| Corn steep liquor | 2.5 |
| Calcium carbonate | 1 |
| Ammonium sulphate | 1 |
| Cotton-seed meal | 0.4 |
| Manganous sulphate | 0.01 |
| Cobalt chloride | 0.0007 |
| Tap water to 100. | |

The pH was adjusted to 6.2 with 4 N sodium hydroxide solution. Sterilization was carried out by heating at 120° C. for 20 minutes. The culture was incubated at 28° C. as previously described for the vegetative culture. After 120 hours of incubation, the production of 100 µg. per cc. of culture broth of the antibiotic complex was obtained.

EXAMPLE 2

The operation was as in Example 1 with the difference that for the productive phase the following medium was employed:

|   | Percent |
|---|---|
| Dextrin | 7 |
| Cotton-seed meal | 1 |
| Corn steep liquor | 1 |
| Ammonium sulphate | 0.6 |
| Calcium carbonate | 0.5 |
| Potassium dihydrogen monophosphate | 0.001 |
| Tap water to 100. | |

Sterilization was carried out by heating at 120° C. for 20 minutes. The pH after sterilization was from 6.6 to 6.8. The culture was incubated at 28° C. under the conditions of Example 1. After 120 hours of incubation, the production of 100 µg. per cc. of culture broth of the antibiotic complex was obtained.

EXAMPLE 3

Two 300 cc. Erlenmeyer flasks were prepared each containing 60 cc. of the medium:

|   | Percent |
|---|---|
| Dextrin | 4 |
| Calcium carbonate | 0.5 |
| Ammonium sulphate | 0.2 |
| Casein | 1 |
| Corn steep liquor | 1 |
| Potassium dihydrogen monophosphate | 0.001 |
| Tap water to 100. | |

Sterliziation was carried out by heating at 120° C. for 20 minutes. The pH of the medium after sterilization was from 6.7 to 7. Each flask was inoculated with 0.5 cc. of a spore suspension obtained by washing, with 5 cc. of sterile distilled water, the patina of a 15 day old slant culture of Streptomyces F.I. 2461 developed on glucose potato agar. The flasks were incubated at 28° C. for 24 hours under the same conditions as in Examples 1 and 2. Thereafter 2 cc. of a culture thus obtained were used to inoculate 300 cc. flasks containing each a productive medium having the same composition as that employed for the vegetative phase above. The flasks were incubated at 28° C. as described for the vegetative phase. After 120 hours, the concentration of the antibiotic complex per cc. of culture broth was 120 µg.

EXAMPLE 4

The operation was as in Example 3 with the difference that for the productive phase the following medium was employed:

|   | Percent |
|---|---|
| Corn steep liquor | 1.5 |
| Ammonium sulphate | 0.4 |
| Calcium carbonate | 0.6 |
| Soluble starch | 2 |
| Glucose | 0.5 |
| Maize meal | 0.1 |
| Soya meal | 0.4 |
| Potassium monohydrogen diphosphate | 0.03 |
| Bacon-fat oil | 0.25 |
| Tap water to 100. | |

The pH was adjusted to 6.7 with 4 N sodium hydroxide solution. The culture was sterilized by heating at 120° C. for 20 minutes. The concentration of the antibiotic complex per cc. of culture broth after 120 hours was 150 µg.

EXAMPLE 5

Three 300 cc. flasks each containing 60 cc. of the cultural medium:

|   | Percent |
|---|---|
| Dextrin | 4.0 |
| Casein | 1.0 |
| Ammonium sulphate | 0.1 |
| Corn steep liquor | 1.0 |
| Calcium carbonate | 0.5 |
| Potassium dihydrogen monophosphate | 0.01 |
| Tap water to 100. | | were sterilized by heating at 120° C. for 20 minutes and then inoculated with a spore suspension of a culture on glucose potato agar (as in Example 1) of *Streptomyces michiganensis* var. *amylolyticus*. The flasks were then incubated for 24 hours at 28° C. on a rotary shaker at 225 r.p.m. A 10 liter fermenter containing 6 liters of the cultural medium described above was inoculated with the contents of three flasks. This culture was incubated at 27° C. with stirring at 400 g. per minute and introduction of 1 liter sterile air per 1 liter of culture per minute. After 20 hours, 2.5 liters of the culture thus obtained were used to inoculated an 80 liter fermenter containing 50 liters of a medium consisting of:

|   | Percent |
|---|---|
| Dextrin | 6.0 |
| Casein | 2.0 |
| Corn steep liquor | 1.0 |
| Calcium carbonate | 0.5 |
| Potassium monophosphate | 0.01 |
| Tap water to 100. | |

Sterilization was carried out by heating at 120° C. for 30 minutes. Fermentation was carried out at 27° C. with a stirring of 250 r.p.m. and with an air stream of 0.7 liter per liter medium per minute. The fermentation lasted for 110 hours. The maximum concentration was 100 µg. of antibiotic complex per cc. of culture broth.

The culture liquid from the fermentation was filtered through a silicious adsorbent. Thus a cake and a filtrate, which was discarded, were obtained. The cake was washed with water, then suspended in methyl alcohol and stirred. The extract was filtered and the extraction was repeated twice. The collected methanol extracts were concentrated under reduced pressure to about 5 liters. The yellow-green precipitate was separated by centrifugation, then washed with water and dried under vacuum over phosphoric anhydride. 25 g. of the crude complex were obtained. The filtrate and the collected washings were adjusted to pH 6.2. They were then twice extracted with a volume of petroleum ether and the aqueous phase was extracted with chloroform. The extract was washed with water, dried over anhydrous sodium sulphate, filtered and concentrated under reduced pressure. Addition of petroleum ether to the oil precipitated a residue of 10 g. of a yellow amorphous precipitate containing about 15% of the antibiotic complex. In all 35 g. of crude product, containing 3.5 g. of antibiotic, were obtained.

12 g. of this crude antibiotic (about 10% concentration) were dissolved in 300 cc. of the lower layer of a chloroform:carbon tetrachloride:methyl alcohol:water (3:2:4:1) mixture and filtered. The filtrate was adsorbed over a chromatographic column containing 900 g. of silicious acid suspended in chloroform. The column was washed with chloroform and 1 liter fractions were collected. Elution was performed and the samples of the various fractions were analyzed by thin layer chromatography. The fractions 1 to 4 were discarded. Elution was then carried out with chloroform:ethanol mixtures having an increasing percentage of alcohol. The fractions from 5 to 20 were discarded. Eluting with chloroform:ethanol (3:1), eluate fractions 21–26 containined Taimycine C. Eluting with chloroform:ethanol (2:1), fractions 27–35 mainly contained the component Taimycine B with lower percentages of Taimycine A and Taimycine C. Eluates with higher percentages of ethanol contained Taimycine A.

The various fractions were collected, concentrated to small volume under reduced pressure, diluted with an equal volume of water, and adjusted to a pH of about 6. By slow evaporation of the residual alcohol, the antibiotics were precipitated as sodium salts from the aqueous concentrate. 130 mg. of Taimycine C were obtained from fractions 21–26. 350 mg. of Taimycine B were obtained from fractions 27–35. 950 mg. of Taimycine A were obtained from fractions 36–50.

The Taimycine C was further purified by crystallization from methanol:water. 90 mg. of pure product were obtained from the 130 mg. crude. Taimycine B was further purified by distribution in countercurrent in a 40 tube Craig apparatus using phases of 25 cc. each of the chloroform:carbon tetrachloride:methyl alcohol:water (2.5:2.5:4.1) system. At the end, Taimycine B was contained in the tubes 6–17. The mixtures B and A were in the tubes 18–23, Taimycine A was in the tubes 24–33.

The three groups of fractions were separately concentrated to small volume, the concentrate was adjusted to pH 6, and then by slowly evaporating off the methyl alcohol, the sodium salts were precipitated. 200 mg. of a mixture containing 60 mg. of Taimycine B and 30 mg. of Tiamycine A were obtained from 340 mg. of crude Taimycine B. The Taimycine A was purified by the same process varying the composition of the mixture used for the countercurrent distribution (chloroform:carbon tetrachloride:methyl alcohol:water 3:2:4:1), and the number of the transfers which were 100. Starting from 800 mg. of product, there were obtained from the silicious acid column:

150 mg. of Taimycine B from tubes 15–35;
100 mg. of mixture from tubes 36–49; and
420 mg. of Taimycine A from tubes 50–75.

From Taimycine B (sodium salt), the corresponding free acid can be obtained as follows. 5 cc. of N acetic acid were added to a solution containing 300 mg. of Taimycine B in 40 cc. of chloroform and 10 cc. of ethanol. After a few minutes, 45 cc. of water were added. The mixture was stirred and the chloroform layer was then separated. The aqueous layer was extracted with 20 cc. of chloroform. The chloroform extracts were collected together, washed with water and dried over anhydrous sodium sulphate. The chloroform solution was filtered off and concentrated to a volume of 10 cc. After a few hours, 250 mg. of a crystalline precipitate were obtained. Recrystallization from chloroform:ethanol gave 200 mg. of Taimycine B melting at 245° C.

In the drawings FIG. 1 shows the ultraviolet absorption spectrum of Taimycine in methanol;

FIG. 2 shows the infrared spectrum of Taimycine A in KBr.

Figure 3:
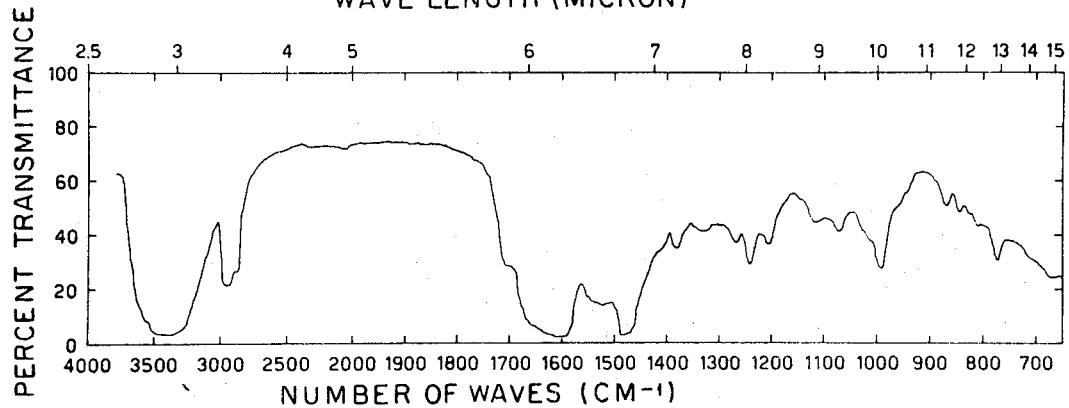
FIG. 3 shows the infrared spectrum of Taimycine B in KBr.

Also presented are the empirical formulae and elementary analysis of the antibiotics produced in accordance with the present invention.

Empirical formulae and elementary analysis of Taimycine A, B and C

Taimycine A (as sodium salt) $C_{30}H_{45}N_2O_8Na \cdot \frac{1}{2}H_2O$ (molecular weight 594.80). Calculated (percent): C, 60.58; H, 7.97; N, 4.71; Na, 3.87. Found (percent): C, 60.30; H, 7.88; N, 4.71; Na, 4.01.

Taimycine B (as free acid) $C_{30}H_{42}N_2O_6$ (molecular weight 526.65). Calculated (percent): C, 68.42; H, 8.04; N, 5.32. Found (percent): C, 68.85; H, 7.81; N, 5.35.

Taimycine C (as sodium salt) $C_{49}H_{76}N_3O_{13}Na$ (molecular weight 938.12). Calculated (percent): C, 62.70; H, 8.17; N, 4.49; Na, 2.46. Found (percent): 62.50; H, 8.11; N, 4.45; Na, 2.39.

We claim:

1. A microbiological process for the preparation of an antibiotic complex Taimycine and its salts which comprises fermenting the microorganism *Streptomyces michiganensis* var. *amylolyticus*, I.P.V. 1953, in a liquid cultural medium containing an assimilable source of carbon and an assimilable source of nitrogen under aerobic conditions with mineral salts from 24° to 37° C. for from 72 to 160 hours at pH of from 6 to 8.

2. Antibiotic complex Taimycine produced by the process of claim 1.

3. The process of claim 1, wherein the antibiotic complex obtained is isolated from the fermentation broth.

4. The process of claim 3, wherein the antibiotic complex is separated into three components, Taimycine A, Taimycine B and Taimycine C.

5. The process of claim 3, wherein the antibiotic complex produced is converted into free acid form.

6. The antibiotic substance Taimycine A, the sodium salt of which has the formula $C_{30}H_{45}N_2O_8Na \cdot \frac{1}{2}H_2O$ and is characterized by the following properties:

(a) white, amorphous powder
(b) elementary analysis: C=60.30%, H=7.88%, N=4.71%; Na=4.01%;
(c) melting point: 250° C. (with decomposition) $[\alpha]_D^{23°}=+7$ (c.=0.9 in dioxane); $[\alpha]_D^{23°}=+24°$ (c.=0.77 in methanol);
(d) in the U.V. spectrum it shows the following absorption maxima:

$\lambda_{max.}^{CH_3OH}$ 240 and 294 m$\mu$; $E_{1cm.}^{1\%}=192$ and 149

$\lambda_{max.}^{NaOH 0.05 N in CH_3OH}$ 244 and 292 m$\mu$; $E_{1cm.}^{1\%}=200$ and 140

$\lambda_{max.}^{HCl 0.05 N in CH_3OH}$ 322.5 m$\mu$; $E_{1cm.}^{1\%}=50$ (e) it is soluble in dimethylformamide, dimethylsulphoxide, dioxane, in aqueous alcohols and aqueous acetone; sparingly soluble in lower alcohols, chloroform, acetone, benzene; practically insoluble in water and petroleum ether;

(f) chromatography on thin layer:
MN Kieselgel G 254, $R_f$=0.60 (butanol:acetone:water 4:5:1)
Kieselgel G, $R_f$=0.60 (butanol:acetone:water 4:5:1)
Kieselgel HF 254–366, $R_f$=0.35 (butanol:acetone:water 4:5:1)
MN Kieselgel G 254, $R_f$=0.50 (ethyl acetate:pyridine:isopropyl alcohol:water 7:2:3:2)
Kieselgel G, $R_f$=0.45 (propanol:ethyl acetate:water 8:1:1)
Alumina, $R_f$=0.50 (butanol:pyridine:water 6:4:3)
(g) the I.R. spectrum for FIG. 2.

7. The sodium salt of Taimycine A of claim 6.

8. The antibiotic substance Taimycine B and has the formula $C_{30}H_{42}N_2O_6$, in which is characterized by
(a) white crystals
(b) melting point: 245° C.
(c) elementary analysis: C=68.86%; H=7.81%; N=5.35%
(d) U.V. spectrum $$\lambda_{max.}^{CH_3OH} \ 322 \ m\mu \ (E_{1cm}^{1\%} \ 306)$$

(e) I.R. spectrum of FIG. 3
and the sodium salt of which has the following properties:
(a) white amorphous powder
(b) elementary analysis: C=67.26%; H=7.97%; N=5.98%; Na=1.51%
(c) melting point: 260° C. (with decomposition) $[\alpha]_D^{23°}=+45°$ (c.=0.9 in dioxane)
(d) at the U.V. spectrum, it shows the following absorption maxima:

$$\lambda_{max.}^{CH_3OH} \ 238 \ and \ 321 \ m\mu; \ D_{1cm}^{1\%}=449 \ and \ 255$$

$$\lambda_{max.}^{NaOH \ 0.05 \ N \ in \ CH_3OH} \ 235 \ and \ 320 \ m\mu; \ E_{1cm}^{1\%}=470 \ and \ 250$$

$$\lambda_{max.}^{HCl \ 0.05 \ N \ in \ CH_3OH} \ 322.5 \ m\mu; \ E_{1cm}^{1\%}=300$$

(e) is soluble in dimethylformamide, dimethylsulphoxide, dioxane, in aqueous alcohols and aqueous acetone, sparingly soluble in lower alcohols, chloroform, acetone, benzene; practically insoluble in water and petroleum ether;
(f) chromatography on thin layer:
MN Kieselgel K 254, $R_f$=0.30 (butanol:acetone:water 4:5:1)
Kieselgel G, $R_f$=0.30 (butanol:acetone:water 4:5:1)
Kieselgel HF 254–366, $R_f$=0.25 (butanol:acetone:water 4:5:1)
MN Kieselgel G 254, $R_f$=0.50 (ethyl acetate:pyridine:isopropylic alcohol:water 7:2:3:2)
Kieselgel G, $R_f$=0.25 (propanol:ethyl acetate:water 8:1:1)
Alumina, $R_f$=0.30 (butanol:pyridine:water 6:4:3)

9. The sodium salt of Taimycine B of claim 8.

10. The antibiotic substance Taimycine C, the sodium salt of which has the formula $C_{49}H_{76}H_3O_{13}Na$ and is characterized by the following properties:
(a) white amorphous powder
(b) elementary analysis: C=62.50%; H=8.11%; N=4.45%; Na=2.39%
(c) melting point 240° C. (with decomposition) $[\alpha]_D^{23°}=-12°$ (c.=0.9 in dioxane)
(d) at the U.V. spectrum it shows the following absorption maxima:

$$\lambda_{max.}^{CH_3OH} \ 240 \ and \ 290 \ m\mu; \ E_{1cm}^{1\%}=152 \ and \ 157$$

$$\lambda_{max.}^{NaOH \ 0.05 \ N \ in \ CH_3OH} \ 246 \ and \ 287 \ m\mu; \ E_{1cm}^{1\%}=154 \ and \ 156$$

$$\lambda_{max.}^{HCl \ 00.5 \ N \ in \ CH_3OH}$$

Figure 4:
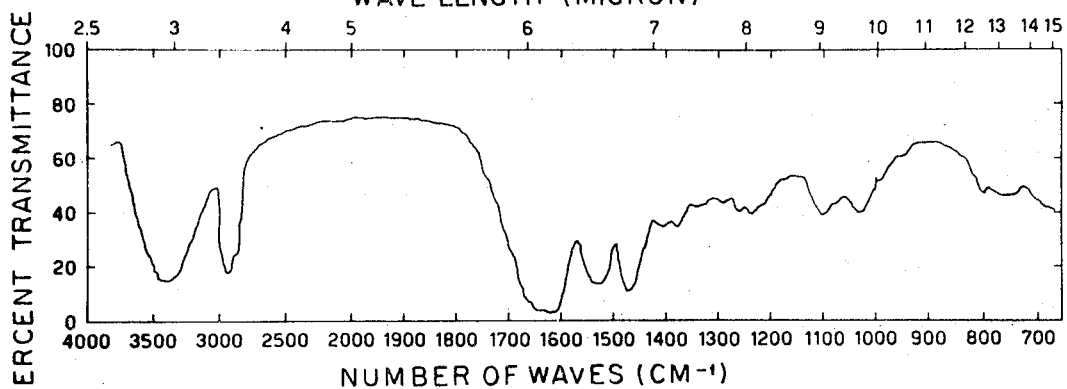
FIG. 4 shows the infrared spectrum of Taimycine C in KBr.

(e) is soluble in dimethylformamide, dimethylsulphoxide, dioxane, in aqueous alcohols and aqueous acetone, sparingly soluble in lower alcohols, chloroform, acetone, benzene; practically insoluble in water and petroleum ether;
(f) chromatography on thin layer:
MN Kieselgel G 254, $R_f$=0.70 (butanol:acetone:water 4:5:1)
Kieselgel G, $R_f$=0.75 (butanol:acetone:water 4:5:1)
Kieselgel HF 254–366, $R_f$=0.50 (butanol:acetone:water 4:5:1)
MN Kieselgel G 254, $R_f$=0.80 (ethyl acetate:pyridine:isopropylic alcohol:water 7:2:3:2)
Kieselgel G, $R_f$=0.50 (propanol:ethyl acetate:water 8:1:1)
Alumina, $R_f$=0.70 (butanol:pyridine:water 6:4:3)
the I.R. spectrum of Taimycin C is seen in FIG. 4.

11. The sodium salt of Taimycine C of claim 10.

References Cited

Derwent Farmdoc #35,097, Abstracting NE68,07516, published Dec. 9, 1968.

JEROME D. GOLDBERG, Primary Examiner

U.S. Cl. X.R.

195—80; 424—122